Figures 2, 3, 4, 5:
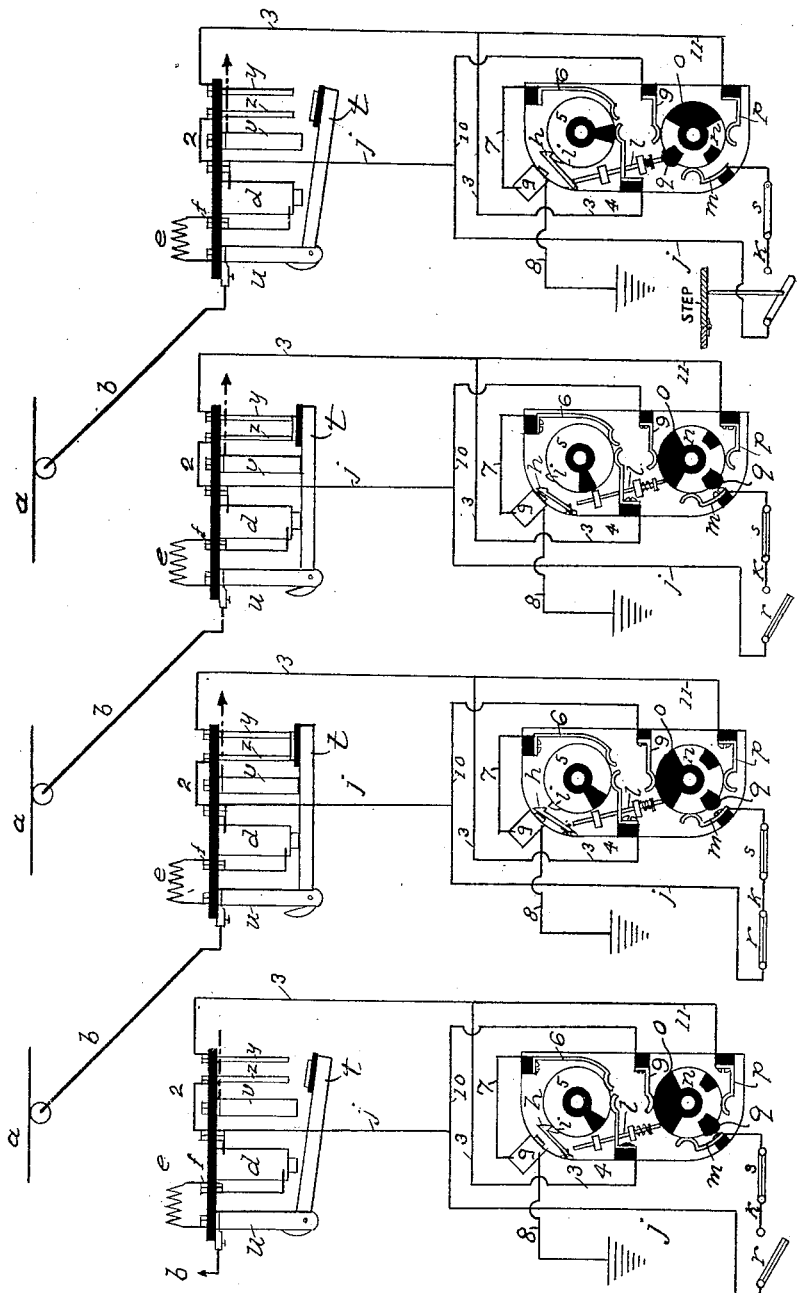

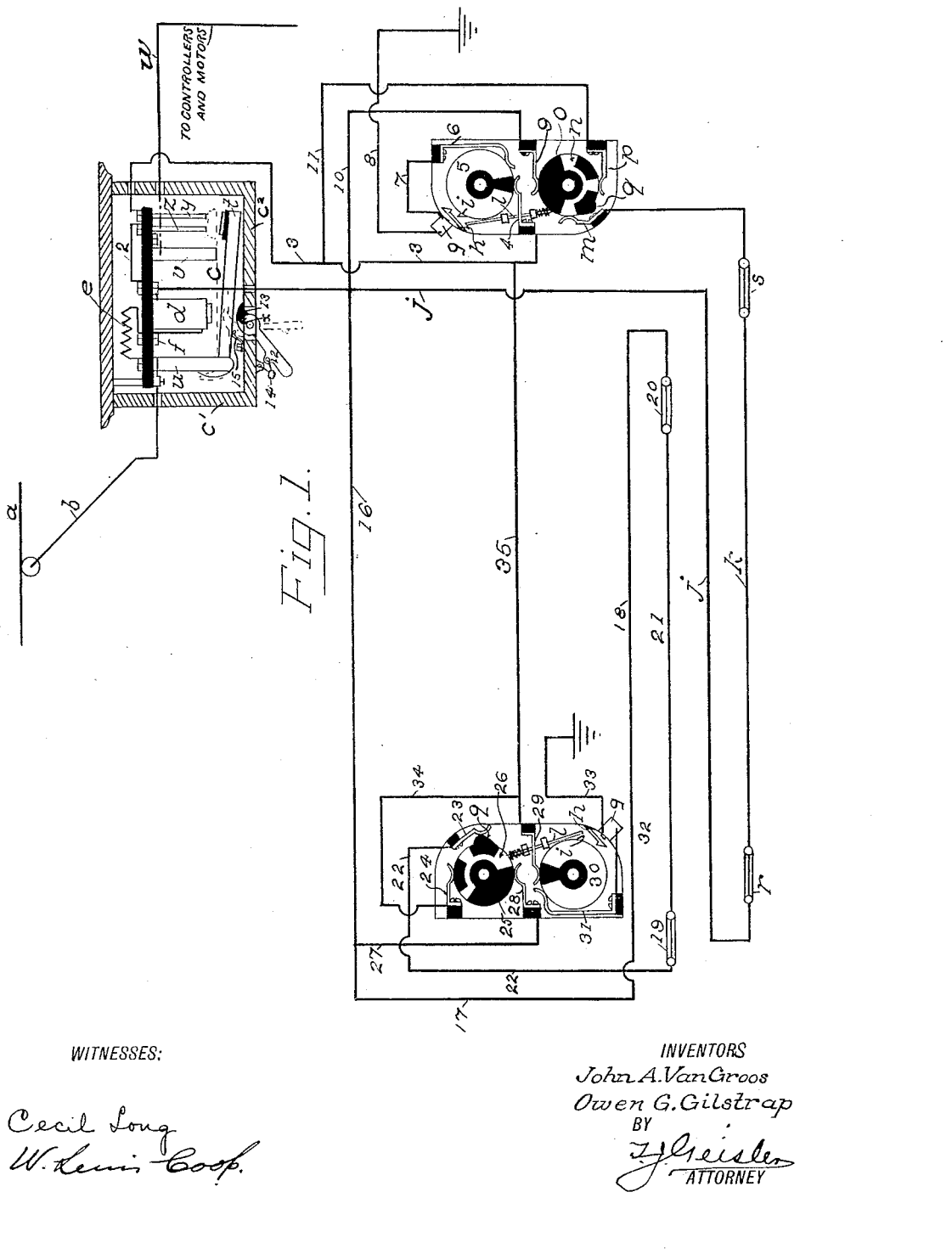

J. A. VAN GROOS & O. G. GILSTRAP.
STEP OPERATING MEANS CONTROLLING STARTING OF ELECTRIC CARS.
APPLICATION FILED APR. 22, 1911.

1,132,134.

Patented Mar. 16, 1915.
2 SHEETS—SHEET 2.

WITNESSES:
Cecil Long
W. Lewis Coop.

INVENTORS
John A. Van Groos
Owen G. Gilstrap
BY
T. J. Geisler
ATTORNEY

UNITED STATES PATENT OFFICE.

JOHN A. VAN GROOS AND OWEN G. GILSTRAP, OF PORTLAND, OREGON.

STEP-OPERATING MEANS CONTROLLING STARTING OF ELECTRIC CARS.

1,132,134.  Specification of Letters Patent.  Patented Mar. 16, 1915.

Substitute for application Serial No. 562,758, filed May 21, 1910. This application filed April 22, 1911.
Serial No. 622,829.

*To all whom it may concern:*

Be it known that we, JOHN A. VAN GROOS and OWEN G. GILSTRAP, citizens of the United States, and residents, respectively, of Portland, county of Multnomah, State of Oregon, have invented a new and useful Improvement in Step-Operating Means Controlling Starting of Electric Cars, of which the following is a specification.

This application is intended as a substitute for our prior application filed May 21, 1910, Serial Number 562,758.

Our invention relates to safety means provided on electric cars for preventing the careless starting thereof while a passenger is still on the step, in the act of boarding or alighting. The idea has heretofore been conceived that it is expedient to provide electric cars with depressible steps, and to combine therewith means preventing the turning on of motor current during the interval a car step is depressed.

Our invention has for its object to render such device more practical, and especially to adapt the same to take care of emergencies. To accomplish the latter purpose, our safety device is so arranged as to keep the car under complete control of the motorman at all times, and he is enabled to reverse the car, or to close the motor circuit to propel the car forward, notwithstanding the depression of one of its steps, if circumstances arise requiring such to be done. Such provision in any type of safety device, of the character referred to, is obviously of great importance, and in fact indispensable.

Our invention further has for its object to utilize our safety device as a means for furnishing reliable evidence, in the case of accidents caused by the falling of a passenger off the platform of the car, in this, that proof of the fact that our device was in operative state, at the time of such accident, would also presumptively establish the fact that the passenger could not have been thrown off the car step by the careless premature starting of the car. To accomplish the last mentioned purpose of our invention, the main instrument of our device is housed in a sealed case, and so long as such seal remains unbroken it will be impossible to tamper with our device and render it inoperative. We provide, however, a lever, in reach of the motorman and normally sealed in place, but which may be broken loose from its seal, and operated to throw the motor into circuit; but these parts are so arranged that when such lever has become so operated, it is automatically locked in place and our device cannot then be reinstated until its case has been opened and the lever released. This arrangement of our device also prevents tampering therewith, and, in so doing, destroying its value as a means of evidence, as mentioned.

Our device may also be provided with a means for stopping the controller at the first notch until the steps are clear, and including means for rendering this part ineffective when the controller is in the reverse position.

A clearer understanding of our invention will be had by having reference to the accompanying drawings. In these all the views shown are diagrammatic.

Figure 1 is a diagrammatic representation of an electric car including a trolley, a motor circuit and a controller and a reversing switch at both ends of the car, and this view illustrates the electric connection of said parts, and the manner in which our device is combined therewith, and operates to control the motor circuit; it also illustrates that the motorman is enabled to apply the power at will for the purpose of reversing the car, notwithstanding the depression of the car step; likewise, that the motorman may, at will, cut out our safety device and simultaneously place the motor in circuit, the same as if our safety device were omitted; Figs. 2, 3, 4 and 5 are condensed diagrammatic representations of our safety device, similar to Fig. 1, except that the means for cutting out our safety device at will are omitted, and except further that these figures show only one set of the usual controller and reversing switch devices provided on the platforms of the car. Said Figs. 2, 3, 4 and 5 illustrate the operations of our device, namely, Fig. 2 represents a step of the car as having been depressed, prior to the closing of the controller, and thereby operating our safety device and rendering it impossible to close the motor circuit for starting the car ahead, and further rendering it impossible to turn the controller disk beyond the first notch; Fig. 3 represents the car as being under headway and the motor therefor in circuit, and illustrates that under such condition the controller disk is released and may be moved to the next position; Fig. 4 represents a car step as having been depressed while the motor circuit is closed and the car is under headway; under these conditions the circuit is maintained through a supplementary system which renders the step-switch inoperative, thus making it impossible to stop the car by depressing the step; and Fig. 5 represents a car step as having been depressed prior to the closing of the motor circuit, thus rendering the closing of the motor circuit impossible, but illustrates further that notwithstanding the depression of the step, the motor circuit may be closed by the turning of the reversing switch to its reverse position, so that the car can be immediately reversed if an emergency so requires.

Before describing the electrical details of our invention, it is to be understood that the car steps are arranged to be depressed or include a depressible tread, and are provided with means automatically lifting the depressed step or tread to its normal position, as soon as released.

As illustrated in the drawings, the power current is taken from a trolley wire, $a$, through the medium of a trolley $b$. The transmission of the electric current to the motor (not shown) of the car (not shown) is, however, controlled by a switch $c$, which, for convenience, we will designate as the governing switch, and said switch is controlled by a magnet $d$. Where practical the magnet is energized by a current taken from the motor circuit, and this is the arrangement shown. The current from the trolley wire passes through a resistance $e$, thence to a binding post $f$, thence through the magnet $d$, thence along wires, $j$, $k$, thence through a contact arm $m$, and through a contact segment $n$, on the rim of a disk $o$, mounted on and rotatable with the shaft of the usual reversing switch provided alongside of the controller on the platform of the car; and the current thence passing through a contact arm $p$ and connecting wires 11 and 3 to the controller arm 4, thence through the disk 5, situated on, and rotating with, the controller shaft, through the contact arm 6, through wire 7, magnet coil $g$ and the connecting wire 8, through the wheels and rails to the ground, as usual.

In the wire course $k$ are provided step-switches $r$, $s$, representing the two steps at one side of the car. So long as these step-switches, $r$, $s$, are closed the magnet $d$ can be energized, and the bar $t$ of the governing switch $c$ lifted and in contact with the contact-post $u$ with which the trolley is connected, so that the current may be transmitted through said post $u$ to the bar $t$, thence to contact arm $v$, thence through the medium of the wire $w$ to the motor; and thus, when the power is turned on by the controller, the motor will be thrown in circuit, as usual.

In the condensed diagrammatic illustration of Fig. 2, the wire courses, $j$, $k$, and all other parts equivalents of like parts shown in Fig. 1 are designated by the same reference characters.

In the condition illustrated in Fig. 2, it is supposed that the car was at a standstill, and that a passenger is in the act of boarding the car, having stepped on the step controlling the step-switch $r$, and in so doing having interrupted the magnet circuit, so that if the controller is turned to the first notch, closing the magnet circuit at disk 5, the step-switch circuit is still open at $r$ and the motor circuit, through the members, $a$, $b$, $u$, $t$, $v$, and $w$, is still opend between $t$ and $v$, and the coil $g$ does not raise the spring dog $h$, which prevents the notch $i$ on the disk 5 from moving into the further positions.

In Fig. 3 it is supposed that the passenger has boarded the car, closing the step-switch and completing the magnet circuit, in which case the magnet $d$ closes the switch $c$ and completes the motor circuit, starting the car. The controller has been held on the first notch, thus preventing the motorman from inadvertently turning on the current too strongly at the start, but the magnet coil $g$ now lifts the spring dog $h$ and releases the disk 5, so that more power may be applied.

In Fig. 4 is illustrated the condition of the car being under headway, and that a passenger, about to alight, has already stepped on the step controlling the step-switch $r$, which act, however, is without effect, for while the motor was in circuit the magnet $d$ had an auxiliary electric connection with the motor current, through the medium of contact arms $y$ and $z$ completed by the switch bar $t$, and which, under the condition shown in Fig. 3, is in contact with contact arms $y$ and $z$, thus connecting the negative pole of the magnet by the wire 2 and said contact arm $y$ with the wire 3, which is connected by contact arm 4, and through the medium of a disk 5, mounted on and rotated with the shaft of the usual controller, with contact arm 6, and thence by wires 7 and 8, the car wheels and the rails, with the ground, so that the circuit of the magnet is maintained, and our governing switch remains closed, notwithstanding the depression of the step-switch $r$.

In Fig. 5 is illustrated the condition of the car having been brought to a standstill, and a passenger, in the act of boarding the car, is supposed to be standing on the step controlling the step-switch $r$, thereby bringing about a condition illustrated and described with respect to Fig. 2; but it is supposed that an emergency has arisen rendering it imperative that the car be immediately reversed, which the motorman proceeds to do by operating his platform reversing switch in the usual way. By such action, the disk $o$, mounted on the shaft of such reversing switch, will be moved from its position shown in Fig. 2 to its position shown in Fig. 5, thus permitting the magnet-energizing current to travel along wire course 10, thence through contact arm 9, through contact segment $n$ on the disk $o$ on the shaft of the reversing switch; thence through contact arm $p$, and finally through wire 11, controller disk 5, wires 7 and 8, the car wheels and the rails, to the ground; thereby energizing the magnet $d$ and simultaneously closing the governing switch, and permitting the application of the power for reversing the car; and to prevent the spring dog $h$ from holding the controller at the first notch, the rod 1 is thrust against the dog $h$ by the reverse lever disk $o$, thus releasing the controller disk 5. This is done to allow the generation of electricity by the reversal of the motor circuit when the car is descending an incline. The electricity generated in this manner is generally used to pump air for the brakes, if the trolley should leave the wire, or the power fail while descending a hill.

The governing switch of our device is contained in a case $c'$ (shown only in Fig. 1) provided with a hinged bottom $c^2$, which is normally locked, and the key thereof retained by a person other than the car crew, so that the case 10 cannot be opened and our device tampered with, which would have the effect of destroying its value for furnishing evidence under the circumstances above described. In the bottom of the case is pivoted a lever 12 (shown only in Fig. 1) provided with an insulated head 13 and normally locked in place by a breakable lock 14, of such character that the motorman, in an emergency, may forcibly pull the lever down, thereby breaking the lock 14, and so positioning the lever as to lift the switch-bar $t$ in contact with the contact-post $u$, thus rendering our safety device inoperable, but closing the motor circuit, so that the motorman then has the same control of the car as if our device were omitted. However, to prevent a condition of uncertainty with respect to the fact as to whether the lever 12 was in its normal position, and our safety device was in action; or whether the lever 12 was inadvertently placed to cut out our device, which doubt would, of course, affect the character of the evidence intended to be furnished by our safety device, we provide a spring dog 15, which engages and locks with the head of the lever 12 when thrown into a perpendicular position to close the motor circuit; the head of the lever 12 being provided with a notch $x$ in which the dog 15 enters, and thus rendering it impossible for the motorman to release the lever and throw it back into its normal position, until the case of our device is first unlocked. Therefore, if, after the happening of an accident the lever 12 is still found in its normal position, as shown in Fig. 1, it would tend to establish the fact that our safety device was in operation and that the accident was not caused by the premature starting of the car.

As our device has been so far described, we referred to the same as being in operative connection only with the set of controller and the reversing switch devices provided on the platform of the forward end of the car, which in Fig. 1 is the right end; and the reversing switch of such device is to be understood as moved to its forward position. Our device may, however, as illustrated in Fig. 1, be operated with the same effect through the medium of the controller and reversing switch located on the rear platform. This is accomplished by the wiring arranged as follows: The wire $j$ is connected rearward through the medium of wire courses 16, 17 and 18, thence through the step-switches 19, 20 in the courses 21 and 22 with contact arm 23. On the shaft of the rear reversing switch is mounted a disk 25, provided with contact segments 26; the disk 25 being rotated by, and relatively adjusted with, the adjustment of the last mentioned reversing switch. Thus as the disk 25 is shown in the left half of Fig. 1, the contact arm 23, and likewise the contact arm 24, connected with the controller wire 34, are in contact with the insulated portions of the disk 25. The contact arm 24 is connected by a wire 34 and contact arm 29 with the disk 30 on the shaft of the controller located on the rear-platform of the car; and the contact arm 29 and wire course 35 effect the electrical connection with wire 3. Hence the step-switches 19, 20, as shown in Fig. 1, are disconnected and inoperative for the time being.

We claim:

1. The combination in an electric car, a motor circuit, a controller, and a reversing switch; of a governing switch included in the motor circuit, a magnet circuit and a magnet, of which the movable member of said governing switch constitutes the armature, said governing switch adapted to be operated by the energizing of the magnet; a depressible step, and a step-switch opened by the depression of such step, said step-switch being in series with the magnet circuit; a lockable case in which said governing switch is contained; a member arranged to be operated to mechanically move the movable member of the governing switch into closed position; and locking means contained in said lockable case and adapted to lock the member last referred to when operated to mechanically close said governing switch.

2. The combination in an electric car, a motor circuit, a controller, and a reversing switch; of a governing switch included in the motor circuit, a magnet circuit and a magnet, of which the movable member of said governing switch constitutes the armature, said governing switch adapted to be operated by the energizing of the magnet; a depressible step, and a step-switch opened by the depression of such step, said step-switch being in series with the magnet circuit; a switch in series with the magnet circuit and operated by the rotation of the shaft of the reversing switch adapted to cause the transmission of the current through the magnet when the reversing switch is turned to reverse position, notwithstanding the opening of the step-switch.

3. The combination in an electric car, a motor circuit, a controller, and a reversing switch; of a governing switch included in the motor circuit, a magnet circuit and a magnet, of which the movable member of said governing switch constitutes the armature, said governing switch adapted to be operated by the energizing of the magnet; a depressible step, and a step-switch opened by the depression of such step, said step-switch being in series with the magnet circuit; a switch in series with the magnet circuit and operated by the rotation of the shaft of the controller adapted to cause the transmission of the current through the magnet while the controller is turned on, notwithstanding the subsequent opening of the step-switch.

4. The combination in an electric car, a motor circuit, a controller, and a reversing switch; of a governing switch included in the motor circuit, a magnet circuit and a magnet, of which the movable member of said governing switch constitutes the armature, said governing switch adapted to be operated by the energizing of the magnet; a depressible step, and a step-switch opened by the depression of such step, said step-switch being in series with the magnet circuit; a switch in series with the magnet circuit and operated by the rotation of the shaft of the controller; a switch in series with the magnet circuit and operated by the rotation of the shaft of the reversing switch adapted to cause the transmission of the current through the magnet while the controller is turned on, notwithstanding the subsequent opening of the step-switch; and also to cause the transmission of the current through the magnet when the reversing switch is turned to reverse position, notwithstanding the opening of the step-switch.

5. The combination in an electric car, a motor circuit, a controller, and a reversing switch; of a governing switch included in the motor circuit, a magnet circuit and a magnet, of which the movable member of said governing switch constitutes the armature, said governing switch adapted to be operated by the energizing of the magnet; a depressible step, and a step-switch opened by the depression of such step, said step-switch being in series with the magnet circuit; and a disk on the shaft of the reversing switch, such disk provided with transmitting and insulating segments on its rim and contact arms in series with the magnet circuit and adapted to cause the transmission of the current energizing the magnet, through the medium of the disk last referred to, when the reversing switch is turned to reverse position, notwithstanding the opening of the step-switch.

6. The combination in an electric car, a motor circuit, a controller, and a reversing switch; of a governing switch included in the motor circuit, a magnet circuit and a magnet, of which the movable member of said governing switch constitutes the armature, said governing switch adapted to be operated by the energizing of the magnet; a depressible step, and a step-switch opened by the depression of such step, said step-switch being in series with the magnet circuit; a disk on the shaft of the controller, such disk provided with transmitting and insulating segments on its rim; and contact arms in series with the magnet circuit and adapted to close a circuit for the transmission of the magnet energizing current, through the medium of the disk last referred to, while the controller is turned on, notwithstanding the subsequent opening of the step-switch.

7. The combination in an electric car, a motor circuit, a controller, and a reversing switch; of a governing switch included in the motor circuit, a magnet circuit and a magnet, of which the movable member of said governing switch constitutes the armature, said governing switch adapted to be operated by the energizing of the magnet; a depressible step, and a step-switch opened by the depression of such step, said step-switch being in series with the magnet circuit; a disk on the shaft of the controller, such disk provided with transmitting and insulating segments on its rim; contact arms in series with the magnet circuit and adapted to close a circuit for the transmission of the magnet energizing current, through the medium of the disk last referred to, while the controller is turned on, notwithstanding the subsequent opening of the step-switch; and a disk on the shaft of the reversing switch, such disk provided with transmitting and insulating segments on its rim and contact arms in series with the magnet circuit and arranged to cause the transmission of the current energizing the magnet, through the medium of the disk last referred to, when the reversing switch is turned to reverse position, notwithstanding the opening of the step-switch.

8. The combination in an electric car, a motor circuit, a controller, and a reversing switch; of a governing switch included in the motor circuit, a magnet circuit and a magnet, of which the movable member of said governing switch constitutes the armature, said governing switch adapted to be operated by the energizing of the magnet; a depressible step, and a step-switch opened by the depression of such step, said step-switch being in series with the magnet circuit; a switch in series with the magnet circuit and operated by the rotation of the shaft of the controller adapted to cause the transmission of the current through the magnet while the controller is turned on, notwithstanding the subsequent opening of the step-switch; a lockable case in which said governing switch is contained; a member arranged to be operated to mechanically move the movable member of the governing switch into closed position; and locking means contained in said closed case and adapted to lock the member last referred to when operated to mechanically close said governing switch.

9. The combination in an electric car, a motor circuit, a controller, and a reversing switch; of a governing switch included in the motor circuit, a magnet circuit and a magnet, of which the movable member of said governing switch constitutes the armature, said governing switch adapted to be operated by the energizing of the magnet; a depressible step, and a step-switch opened by the depression of such step, said step-switch being in series with the magnet circuit; a switch in series with the magnet circuit and operated by the rotation of the shaft of the reversing switch adapted to cause the transmission of the current through the magnet when the reversing switch is turned to reverse position, notwithstanding the opening of the step-switch; a lockable case in which said governing switch is contained; a member arranged to be operated to mechanically move the movable member of the governing switch into closed position; and locking means contained in said closed case and adapted to lock the member last referred to when operated to mechanically close said governing switch.

10. The combination in an electric car, a motor circuit, a controller, and a reversing switch electrically connected with said transmitting means; of a governing switch included in the motor circuit, a magnet circuit and a magnet, of which the movable member of said governing switch constitutes the armature, said governing switch adapted to be operated by the energizating of the magnet; a depressible step, and a step-switch opened by the depression of such step, said step-switch being in series with the magnet circuit; a switch in series with the magnet circuit and operated by the rotation of the shaft of the controller; a switch in series with the magnet circuit and operated by the rotation of the shaft of the reversing switch adapted to cause the transmission of the current through the magnet while the controller is turned on, notwithstanding the subsequent opening of the step-switch; also to cause the transmission of the current through the magnet when the reversing switch is turned to reverse position, notwithstanding the opening of the step-switch; a lockable case in which said governing switch is contained; a member arranged to be operated to mechanically move the movable member of the governing switch into closed position; and locking means contained in said closed case and adapted to lock the member last referred to when operated to mechanically close said governing switch.

11. The combination in an electric car, a motor circuit, a controller, and a reversing switch; of a governing switch included in the motor circuit, a magnet circuit and a magnet, of which the movable member of said governing switch constitutes the armature, said governing switch adapted to be operated by the energizing of the magnet; a depressible step, and a step-switch opened by the depression of such step, said step-switch being in series with the magnet circuit; a disk on the shaft of the reversing switch, such disk provided with transmitting and insulating segments on its rim and contact arms in series with the magnet circuit and adapted to cause the transmission of the current energizing the magnet, through the medium of the disk last referred to, when the reversing switch is turned to reverse position, notwithstanding the opening of the step-switch; a lockable case in which said governing switch is contained; a member arranged to be operated to mechanically move the movable member of the governing switch into closed position; and locking means contained in said closed case and adapted to lock the member last referred to when operated to mechanically close said governing switch.

12. The combination in an electric car, a motor circuit, a controller, and a reversing switch; of a governing switch included in the motor circuit, a magnet circuit and a magnet, of which the movable member of said governing switch constitutes the armature, said governing switch adapted to be operated by the energizing of the magnet; a depressible step, and a step-switch opened by the depression of such step, said step-switch being in series with the magnet circuit; a disk on the shaft of the controller, such disk provided with transmitting and insulating segments on its rim, contact arms in series with the magnet circuit and adapted to close the transmission of the magnet energizing current, through the medium of the disk last referred to while the controller is turned on, notwithstanding the subsequent opening of the step-switch; a lockable case in which said governing switch is contained; a member arranged to be operated to mechanically move the movable member of the governing switch into closed position; and locking means contained in said closed case and adapted to lock the member last referred to when operated to mechanically close said governing switch.

13. The combination in an electric car, a motor circuit, a controller, and a reversing switch; of a governing switch included in the motor circuit, a magnet circuit and a magnet, of which the movable member of said governing switch constitutes the armature, said governing switch adapted to be operated by the energizing of the magnet; a depressible step, and a step-switch opened by the depression of such step, said step-switch being in series with the magnet circuit; a disk on the shaft of the controller, such disk provided with transmitting and insulating segments on its rim, contact arms in series with the magnet circuit and adapted to close the transmission of the magnet energizing current, through the medium of the disk last referred to while the controller is turned on, notwithstanding the subsequent opening of the step-switch; a disk on the shaft of the reversing switch, such disk provided with transmitting and insulating segments on its rim and contact arms in series with the magnet circuit and arranged to cause the transmision of the current energizing the magnet, through the medium of the disk last referred to, when the reversing switch is turned to reverse position, notwithstanding the opening of the step-switch; a lockable case in which said governing switch is contained; a member arranged to be operated to mechanically move the movable member of the governing switch into closed position; and locking means contained in said closed case and adapted to lock the member last referred to when operated to mechanically close said governing switch.

14. The combination in an electric car, a motor circuit, a controller, and a reversing switch; of a governing switch included in the motor circuit, a magnet circuit and a magnet, of which the movable member of said governing switch constitutes the armature, said governing switch adapted to be operated by the energizing of the magnet; a depressible step, and a step-switch opened by the depression of such step, said step-switch being in series with the magnet circuit; a switch in series with the magnet circuit and operated by the rotation of the shaft of the controller; a switch in series with the magnet circuit and operated by the rotation of the shaft of the reversing switch adapted to cause the transmission of the current through the magnet while the controller is turned on, notwithstanding the subsequent opening of the step-switch; also to cause the transmission of the current through the magnet when the reversing switch is turned to reverse position, notwithstanding the opening of the step-switch; a lockable case in which said governing switch is contained; a member arranged to be operated to mechanically move the movable member of the governing switch into closed position; locking means contained in said closed case and adapted to lock the member last referred to when operated to mechanically close said governing switch; an indicating device, and means, operated by the operation of the movable member of said governing switch, adapted to announce the movement of such movable member.

JOHN A. van GROOS.
OWEN G. GILSTRAP.

Witnesses:
  CECIL LONG,
  W. LEWIS COOK.

Copies of this patent may be obtained for five cents each, by addressing the "Commissioner of Patents, Washington, D. C."